United States Patent [19]
Satoh et al.

[11] Patent Number: 4,740,676
[45] Date of Patent: Apr. 26, 1988

[54] RANGE FINDING AUTOMATIC FOCUSING SYSTEM EMPLOYING A ROTATABLE TRANSPARENT PLATE AND A HALF-SPLIT LIGHT RECEIVING ELEMENT

[75] Inventors: Hironobu Satoh; Takesuke Maruyama, both of Yokohama; Takashi Azumi, Katsuta; Kenji Sano; Takanori Hisada, both of Yokohama, all of Japan

[73] Assignee: Hitachi, Ltd., Tokyo, Japan

[21] Appl. No.: 858,792

[22] Filed: May 1, 1986

[30] Foreign Application Priority Data

May 1, 1985 [JP] Japan .................................. 60-92230

[51] Int. Cl.$^4$ .............................................. G01J 1/20
[52] U.S. Cl. ................................. 250/201; 354/403
[58] Field of Search ................ 250/201 AF, 204; 354/403; 356/1, 4

[56] References Cited
U.S. PATENT DOCUMENTS

| | | | |
|---|---|---|---|
| 3,435,744 | 4/1969 | Stimson | 354/403 |
| 3,442,193 | 5/1969 | Pagel | 354/403 |
| 3,443,502 | 5/1969 | Harvey | 354/403 |
| 3,622,797 | 11/1971 | Bragg | 250/201 AF |
| 4,123,650 | 10/1978 | Hosoe et al. | 356/4 |
| 4,355,904 | 10/1982 | Balasubramanian | 356/1 |
| 4,383,168 | 5/1983 | Luck, Jr. | 250/201 AF |
| 4,445,029 | 4/1984 | Nagaoka et al. | 250/201 AF |
| 4,459,004 | 7/1984 | Morizumi | 354/403 |

*Primary Examiner*—David C. Nelms
*Assistant Examiner*—William L. Oen
*Attorney, Agent, or Firm*—Antonelli, Terry & Wands

[57] ABSTRACT

An automatic focusing apparatus comprises a light emitting element emitting a beam of electromagnetic radiation directed toward a subject through a light projecting lens, a light receiving element receiving a beam spot reflected from the subject and passing through a light receiving lens, and a parallel-surface transparent plate disposed rotatably between the light receiving lens and the light receiving element. The parallel-surface transparent plate is rotated in interlocking relation with linear movement of an optical lens moving together with movement of a focus ring, thereby automatically attaining the focus by ceasing the movement of the lens optical system as soon as the output signal of the light receiving element attains a predetermined level.

3 Claims, 3 Drawing Sheets

RANGE FINDING AUTOMATIC FOCUSING SYSTEM EMPLOYING A ROTATABLE TRANSPARENT PLATE AND A HALF-SPLIT LIGHT RECEIVING ELEMENT

BACKGROUND OF THE INVENTION

This invention relates to an automatic focusing apparatus suitable for incorporation in, for example, a video camera.

Video cameras are provided with means for automatically adjusting the focus so as to enhance the operability, and various automatic focusing means have been proposed hitherto. An example of such means is disclosed in, for example, U.S. Pat. Nos. 3,435,744, 3,442,193 and 3,443,502. The apparatus disclosed in the U.S. patents cited above includes light emitting means and light receiving means. A beam of light emitted from the light emitting means is directed toward a subject, and a portion of the light beam reflected from the subject is received by the light receiving means. A sensor in the light receiving means senses the position of irradiation with the reflected light beam thereby adjusting the focus.

The practical structure of such a prior art automatic focusing apparatus will be described with reference to FIG. 1. In FIG. 1, the reference numerals 1, 2, 3, 4, 5, 6, 7, 8 and 13 designate a light projecting lens, a light emitting element, a light receiving lens, a light receiving element, a focus ring, a cam provided on the rear end of the focus ring, a link mechanism, a resilient member, and a fixed cylinder including lenses VE and RE respectively.

This automatic focusing apparatus is composed of a light emitter part including the light projecting lens 1 and the light emitting element 2, a light receiver part including the light receiving lens 3 and the light receiving element 4 provided with a half-split sensor, and a light-receiving element driver part including the focus ring 5 having the cam 6, the link mechanism 7, and the resilient member 8.

The focus ring 5 is coupled with the fixed cylinder 13 by multiple screws thereby being rotated by the motor M and moving forward and backward directions in accordance with its rotation. A focusing lens element LE functioning as an accurately focusing element is incorporated in the focus ring 5, and a relay lens element RE and a variable lens element VE having its optical axis aligning with that of the lens element LE are disposed within the fixed cylinder 13. An image of a subject 11 is focused by the combination of the lens element LE, the variable lens element VE and the relay lens element RE on an image-receiving surface of a solid-state image pickup element SE (or a camera tube).

The light emitter part and the light receiver part are so disposed that the optical axes of the light projecting lens 1 and light receiving lens 3 are spaced apart by a predetermined distance l and are parallel to each other. The focus ring 5 is rotated by a motor M. The link mechanism 7 is disposed between the focus ring 5 and the light receiving element 4 so that the rotation of the focus ring 5 can be transmitted to the light receiving element 4 to cause linear movement of the light receiving element 4 in a direction as shown by the arrow x. This link mechanism 7 includes a first lever having a length $l_1$ and a second lever having a length $l_2$, and the connection point of these levers is rotatably pivoted to a stationary member of the apparatus. The other end of the first lever having the length $l_1$ is in contact with the cam 6 provided on the rear end of the focus ring 5, and the other end of the second lever having the length $l_2$ is in contact with a portion of the light receiving element 4. The light receiving element 4 is resiliently biased by the resilient member 8 so that the other end of the second lever of the link mechanism 7 can be brought into intimate contact with the portion of the light receiving element 4 without any clearance therebetween.

Because of the above structure, the rotating movement of the focus ring 5 is converted by the combination of the cam 6 and the link mechanism 7 into a linear movement in a direction as shown by the arrow z, thereby causing the linear movement of the light receiving element 4 in the direction of the arrow x. The stroke of the linear movement of the focus ring 5 due to its rotation is magnified by the cam 6, so that the light receiving element 4 can be positioned with very high accuracy.

In operation, a beam of light emitted from the light emitting element 2 is directed through the light projecting lens 1 toward and onto the subject 11 located at a position spaced by a distance y from the light receiving lens 3. The half-split sensor provided on the light receiving element 4 is composed of two sensing elements $S_1$ and $S_2$ joining each other, as shown in FIG. 1B when a reflected beam spot SP impinges on the junction (the splitting line) between the two sensing elements $S_1$ and $S_2$, that is, when the beam spot SP impinges uniformly on the two sensing elements $S_1$ and $S_2$ at the junction, the two sensing elements $S_1$ and $S_2$ generate output signals which are equal to each other. The reflected beam spot SP from the subject (object) 11 passes through the light receiving lens 3 to be focused on the half-split sensor 4 provided on the light receiving element.

When the reflected beam spot SP does not impinge uniformly on the junction (the splitting line) between the two sensing elements $S_1$ and $S_2$ of the half-split sensor, that is, when the reflected beam spot SP impinges on only one of the two sensing elements $S_1$ and $S_2$, the focus ring 5 is rotated by the motor M to cause movement of the light receiving element 4 in the direction of the arrow x until the reflected beam spot SP impinges uniformly on the two sensing elements $S_1$ and $S_2$ at the junction therebetween. The motor M ceases to rotate when the reflected beam spot SP impinges uniformly on the two sensing elements $S_1$ and $S_2$ at the junction therebetween, as shown in FIG. 1. With the rotation of the focus ring 5, the focusing lens LE in the photographic optical system TL of the video camera moves in the direction of the optical axis. The optical system TL of the video camera is capable of accurate focusing when finally the reflected beam spot SP impinges uniformly on the junction between the two sensing elements $S_1$ and $S_2$ of the half-split sensor of the light receiving element 4.

The stroke x of movement of the light receiving element 4 is a function of the spacing l between the optical axis of the light projecting lens 1 and that of the light receiving lens 3, the focal distance f of the light receiving lens 3, and the distance y from the light receiving lens 3 to the subject 11, as follows:

$$x = fl/y \tag{1}$$

Also, the stroke x of movement of the light receiving element 4 is related to the stroke z of movement of the focus ring 5 having the cam 6 and the lengths $l_1$, $l_2$ of the respective levers of the link mechanism 7, as follows:

$$x = l_2 z / l_1 \quad (2)$$

In order to reduce the overall size of the video camera, it is necessary to reduce the size of the light emitter part and that of the light receiver part. For this purpose, it is necessary to shorten the spacing l. However, shortening the spacing l results in a corresponding decrease of the movable stroke x of the light receiving element 4 in view of the equation (1). It is therefore necessary to decrease the length $l_2$ of the second lever of the link mechanism 7 or the movable stroke z of the focus ring 5 having the cam 6 or to increase the length $l_1$ of the first lever of the link mechanism 7, in the equation (2). However, since the cam 6 is provided for magnifying the stroke z of linear movement of the focus ring 5 thereby positioning the light receiving element 4 with very high accuracy as described above, it is objectionable to decrease the movable stroke z of the focus ring 5 having the cam 6. Further, decreasing the length $l_2$ of the second lever of the link mechanism 7 is limited from the aspect of design.

Also, when the length $l_1$ of the first lever of the link mechanism 7 is increased, the light receiver part is correspondingly spaced apart from the photographic lens (i.e. objective lens), resulting in such a defect that the overall size of the video camera increases inevitably or the reflected beam spot from the subject 11 deviates greatly in the range finder depending on the distance y from the light receiving lens 3 to the subject 11. Thus, when the link mechanism 7 is incorporated, it is difficult to decrease the spacing (the base length) l between the light emitter part and the light receiver part, and, also, the structure of the automatic focusing apparatus becomes quite complex.

SUMMARY OF THE INVENTION

It is a primary object of the present invention to provide an automatic focusing apparatus which obviates the prior art defects pointed out above and which is simplified in structure and reduced in size while maintaining the high accuracy of focus adjustment.

The present invention which attains the above object is featured in that a transparent plate is disposed between a light receiving lens and a light receiving element so as to be rotatable around a shaft extending orthogonal with respect to a plane including the optical axis of the light receiving lens and that of a light projecting lens, and the transparent plate is rotated with the rotation of a focus ring, thereby adjusting the state of impingement of a reflected beam spot on the light receiving element so that the subject is in sharp focus at all times.

DESCRIPTION OF THE PREFERRED EMBODIMENTS

The present invention will now be described in detail with reference to the drawings.

Figure 2:
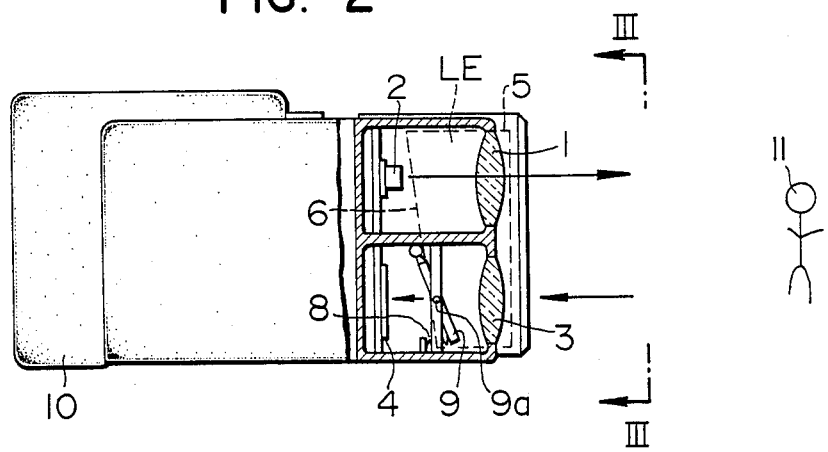
FIG. 2 is a partly sectional, side elevation view of a video camera in which a preferred embodiment of the automatic focusing apparatus according to the present invention is incorporated.

FIG. 2 is a partly sectional, side elevation view showing a video camera in which a preferred embodiment of the automatic focusing apparatus according to the present invention is incorporated.

Figure 1B:
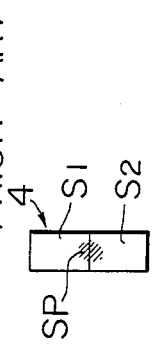
FIGS. 1A and 1B are diagrammatic views showing schematically the structure of a prior art automatic focusing apparatus.
Figure 1A:
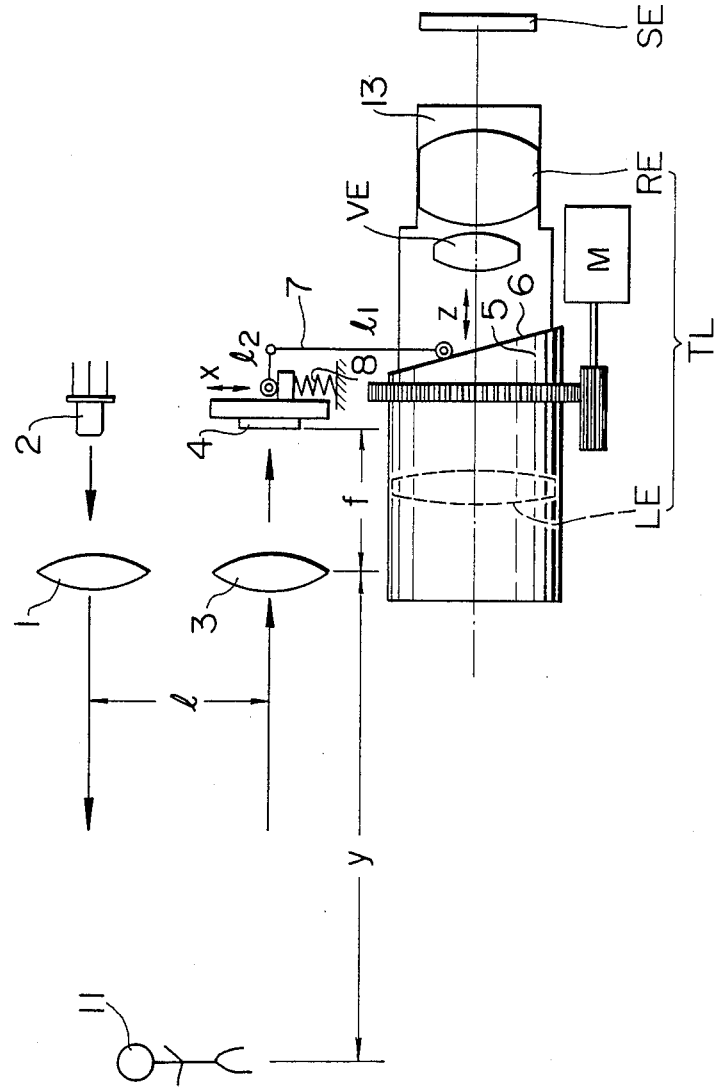

In FIG. 2, the reference numerals 9, 9a, 10 and 11 designate a parallel-surface transparent plate, a rotary shaft of the plate 9, the body of the video camera, and a subject respectively, and like reference numerals are used to designate like parts appearing in FIG. 1.

Figure 3:
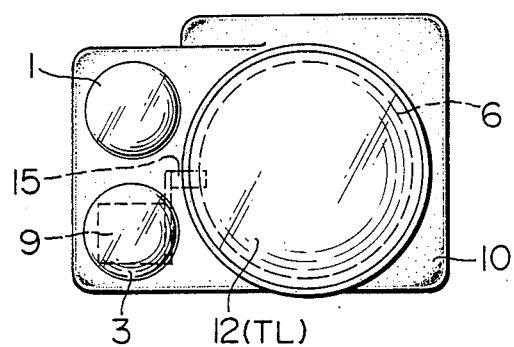
FIG. 3 is a front elevation view of the video camera shown in FIG. 2, the view being taken from a subject side.

FIG. 3 is a front elevation view of the video camera when viewed from the side of the subject 11, and the reference numeral 12 designates a photographic lens TL. In FIG. 3, the same reference numerals are used to designate the same parts appearing in FIG. 2.

In FIGS. 2 and 3, the automatic focusing apparatus embodying the present invention is mounted to a side of the video camera body 10 at a position which will not obstruct the region of photographing when viewed from the photographic lens 12.

The term "parallel-surface transparent plate" used in the present invention will now be defined. The word "parallel-surface" means that the front surface and the rear surface of the plate are substantially parallel to each other and does not mean that these surfaces are optically accurately parallel. Also, the word "transparent" means that the plate is permeable to electromagnetic radiation emitted from light emitting means and does not mean that the plate is permeable to visible light only.

In the embodiment of the present invention, a light emitter part is composed by a light projecting lens 1 and a light emitting element (for example, an infrared emitting diode) 2; and a light receiver part is composed by a light receiving lens 3, a light receiving element (for example, a half-split PIN photodiode) 4, the parallel-surface transparent plate (for example, a glass plate or a plastic plate) rotatable around the rotary shaft 9a extending orthogonal with respect to a plane including the optical axes of the lenses 1 and 3, a resilient member (for example, a tension coil spring) 8 for resiliently bringing the parallel-surface transparent plate 9 into intimate contact with a cam 6 of a focus ring 5 causing movement of the photographic lens 12.

A beam of light emitted from the light emitting element 2 is projected through the light projecting lens 1 onto the subject 11, and the reflected beam spot from the subject 11 passes through the light receiving lens 3 and parallel-surface transparent plate 9 to impinge on the light receiving element 4. When the reflected beam spot does not uniformly impinge on two sensing elements of a half-split sensor provided on the light receiving element 4, that is, when the subject 11 is out of focus, the focus ring 5 is rotated by a motor M similar to shown in FIG. 1. Consequently, the parallel-surface transparent plate 9 making intimate contact with the cam 6 of the focus ring 5 having the focusing lens LE is also rotated around the rotary shaft 9a until the reflected beam spot impinges uniformly on the two sensing elements of the half-split sensor at the junction therebetween. Thus, the focus of the photographic lens TL of the video camera is accurately adjusted.

Figure 4:
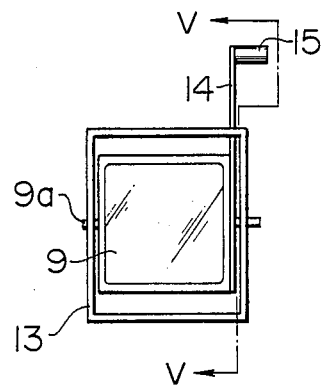
FIG. 4 is a front elevation view showing the manner of mounting the parallel-surface transparent plate in the illustrated embodiment of the present invention.
Figure 5:
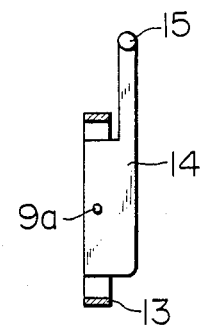
FIG. 5 is a side elevation view of FIG. 4.

FIG. 4 is an elevation view showing the manner of mounting the parallel-surface transparent plate 9 shown in FIG. 2, and FIG. 5 is a side elevation view of FIG. 4. In FIGS. 4 and 5, the reference numerals 13, 14 and 15 designate a frame supporting the rotary shaft 9a of the transparent plate 9, a lever fixed to the transparent plate 9, and a tubular rod fixed to the other end of the lever 14, respectively. In FIGS. 4 and 5, the same reference numerals are used to designate the same parts appearing in FIG. 2.

Referring to FIGS. 4 and 5, the frame 13 is fixed to a casing in which the various members (including the light receiving lens 3 and light receiving element 4) of the light receiver part are mounted. The frame 13 is provided with a bearing (not shown) in which the rotary shaft 9a carrying the parallel-surface transparent plate 9 is smoothly rotatably journalled. The lever 14 is fixed to a side surface of the parallel-surface transparent plate 9, and the tubular rod 15 is fixed to the other or free end of the lever 14 to make contact with the cam 6 of the focus ring 5 shown in FIG. 2. The lever 14 is shaped to avoid collision with the frame 13, so that it may not collide against the frame 13 when the parallel-surface transparent plate 9 is rotated to an angular position at which the plate 9 makes an angle of 90° with respect to the optical axis of the lens 3.

Figure 6:
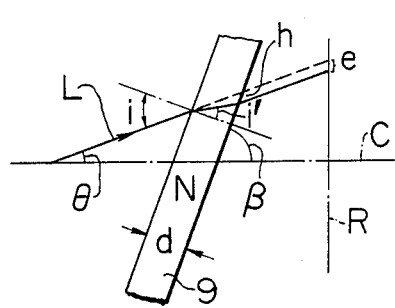
FIG. 6 illustrates the optical function of the parallel-surface transparent plate.

The function of the parallel-surface transparent plate 9 will now be described in detail with reference to FIG. 6.

Suppose now that the parallel-surface transparent plate 9 inclines by an angle $\beta$ with respect to the optical axis C of the light receiving lens 3. In such a case, a light beam L impinging on the parallel-surface transparent plate 9 at an angle $\theta$ with respect to the optical axis C of the lens 3 is displaced by e at the light receiving surface R when compared to the case where the parallel-surface transparent plate 9 is not present. This displacement e is given by the following equation:

$$e = h(\sin \beta - \cos \beta \tan \theta) \quad (3)$$

where,
$h = d(\tan i - \tan i')$ $i = \theta + 90° - \beta$
$\sin i = N \sin i'$.

Thus, the displacement e is determined by the refractive index N and thickness d of the parallel-surface transparent plate 9, the angle $\theta$ between the optical axis C and the light beam L impinging on the parallel-surface transparent plate 9, and the inclination angle $\beta$ of the parallel-surface transparent plate 9 with respect to the optical axis C. The refractive index N is determined by the material of the parallel-surface transparent plate 9, and the thickness d is determined by determining the shape and size of the parallel-surface transparent plate 9. Further, the angle $\theta$ is determined by the subject distance (y in FIG. 1) and the base length (which is the spacing between the optical axis of the light projecting lens 1 and that of the light receiving lens 3 and is l in FIG. 1). Therefore, by controlling the angle $\beta$, the displacement e can be determined.

Suppose that the subject distance y is y=1 m, the base length l is l=25 mm, the focal distance f of the light receiving lens 3 is f=30 mm, and the refractive index N and thickness d of the parallel-surface transparent plate 9 are N=1.5168 and d=3 mm respectively. Then, in the absence of the parallel-surface transparent plate 9, the light beam L is displaced from the optical axis C by x which is given by the following equation:

$$x = fl/y$$

Thus, the value of x is calculated as x=0.75 mm. The angle $\beta$, which is required to cancel this displacement x and to cause coincidence of the light beam L with the optical axis C by the function of the parallel-surface transparent plate 9, is calculated by substituting e=0.75 mm in the equation (3). The angle $\beta$ is calculated as $\beta$=54.7°, and the parallel-surface transparent plate 9 is required to be inclined by 54.7° with respect to the optical axis C to attain coincidence of the light beam L with the optical axis C.

The angle $\beta$ between the optical axis C and the parallel-surface transparent plate 9 is calculated according to the equation (3) for all the values of y ranging from a closest distance of y=1 m to y=infinity. The result of calculation teaches that the angle $\beta$ lies within the range of from 54.7° to 90°.

The rotation angle (90°−$\beta$°) of the parallel-surface transparent plate 9 determined on the basis of the calculated angle $\beta$ varies greatly depending on the spacing (the base length) l between the optical axis of the light projecting lens 1 and that of the light receiving lens 3 and also on the thickness d of the parallel-surface transparent plate 9.

Thus, even when the base length l is shortened, a rotation angle equivalent to that required before the shortening of the base length l can be provided by suitably selecting the thickness d of the parallel-surface transparent plate 9.

Describing more concretely, when the base length l is set at l=50 mm under the aforementioned conditions, the rotation angle of a flat glass plate 9 having a thickness d of 3 mm is calculated as 56.2°. Then, when the base length l is decreased to ½ or l=25 mm while maintaining the plate thickness d at d=3 mm, the rotation angle decreases to 35.4°. However, when the plate thickness d is decreased to d=2 mm, the rotation angle increases to 47.4°. Thus, the rotation angle can be increased by decreasing the plate thickness d even when the base length l is shortened. Therefore, the accuracy of rotation can be maintained constant when the photographic lens is the same.

At an excessively small angle $\beta$, total reflection may occur when the light beam L emerges from the parallel-surface transparent plate 9 into ambient air. However, in the case of the illustrated embodiment, the incident angle is 39.7° even when the angle $\beta$ is as small as 15.8° at the plate thickness d of 1 mm. This incident angle of 39.7° is smaller than the total reflection angle of 41.2°, and no total reflection occurs.

The shape of the cam 6 in the illustrated embodiment differs from that of the prior art cam. However, the shape of the cam 6 can be easily calculated on the basis of the stroke of movement of the focusing lens LE and the rotation angle of the parallel-surface transparent plate 9 calculated from the optical design and, also, on the basis of the length of the lever 14 directly fixed to the parallel-surface transparent plate 9 to make intimate engagement with the cam surface.

When the parallel-surface transparent plate 9 is inclined, the spot image incident upon the light receiving element 4 may be degraded due to the influence of aberration. In such a case, degradation of the spot image can be minimized by turning the spherical surface of the light receiving lens 3 into an aspherical surface and combining such a lens 3 with the parallel-surface transparent plate 9. In the embodiment of the present invention, an aspherical surface given by the following expression is exmployed:

$$Z = \frac{c \cdot h^2}{1 + \sqrt{1 - (K+1)c^2h^2}} + (AE)h^4$$

where h = distance from the vertex of the surface in a direction orthogonal to the optical axis
Z = deviation from the vertex of the surface at the distance h
$c = 6.7743 \times 10^{-2}$
$K = -0.7135243$
$AE = 6.550627 \times 10^{-6}$ In the embodiment of the present invention, the parallel-surface transparent plate 9 is disposed between the light receiving lens 3 and the light receiving element 4. Therefore, the light quantity loss will be larger than hitherto, because such a loss occurs in the parallel-surface transparent plate 9 and occurs also due to reflection at the surface of the parallel-surface transparent plate 9. In the illustrated embodiment, however, an anti-reflection coating is applied to the parallel-surface transparent plate 9 to avoid the light quantity loss.

A coating of $MgF_2$ having a film thickness of about 0.3 μm is preferably employed to avoid the light quantity loss.

Also, by forming the parallel-surface transparent plate 9 by a material which absorbs visible radiation and transmits infrared radiation only, the plate 9 can be used as a filter which cuts off radiation adversely affecting the light receiving element 4.

The effect similar to that described above can be exhibited even when the parallel-surface transparent plate 9 is replaced by a non-parallel surface plate, a meniscus lens or a convex lens.

The parallel-surface transparent plate 9 may be disposed at any desired position between the light receiving lens 3 and the light receiving element 4, unless it collides against the light receiving lens 3 or light receiving element 4 when inclined or unless its side portions intrude into the straight lines connecting between the effective diameter of the light receiving lens 3 and the outer periphery of the light receiving surface of the light receiving element 4. In the illustrated embodiment, the parallel-surface transparent plate 9 is disposed at a position spaced from the surface of the light receiving element 4 by a distance equal to about ⅓ of the focal distance of the light receiving lens 3 so as to minimize the size of the parallel-surface transparent plate 9.

Figure 7:
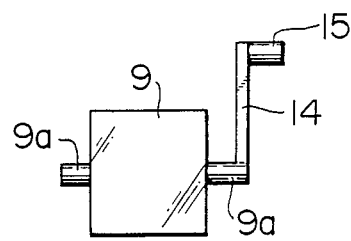
FIG. 7 is a front elevation view showing another form of the parallel-surface transparent plate.

Also, as shown in FIG. 7, the parallel-surface transparent plate 9 may be molded from a plastic material in integral relation with the rotary shaft 9a, lever 14 and rod 15, so as to decrease the number of parts, to reduce the total weight and to eliminate the step of adjustment of the position of the lever 14 relative to the parallel-surface transparent plate 9 during assembling.

Thus, according to the illustrated embodiment, the thickness d of the parallel-surface transparent plate is decreased to deal with shortening of the base length l, so that the rotation angle of the parallel-surface transparent plate can be maintained constant. Since, also, the parallel-surface transparent plate can be molded together with the rotary shaft, lever and rod, the number of parts can be decreased.

Thus, according to the present invention, the range finding operation can be easily achieved even when the base length l is shortened. Therefore, the complex link mechanism employed hitherto for moving the light receiving element is unnecessary, and an automatic focusing apparatus of simplified structure and small size can be provided.

It will be understood from the foregoing detailed description of the present invention that the spacing between the light emitter part and the light receiver part can be sufficiently narrowed, and the structure of the mechanism for transmitting the rotating movement of the focus ring to the parallel-surface transparent plate can be greatly simplified to provide a compact overall arrangement of the parts. Further, since the light receiving element can be held stationary, any excessive load is not imparted to the light receiving element, thereby greatly improving the reliability of the automatic focusing apparatus.

We claim:

1. An automatic focusing apparatus comprising a light emitter part including a light-projecting optical system and a light emitting element for directing a beam of electromagnetic radiation emitted from said light emitting element toward a subject, a light receiver part including a light-receiving optical system and a half-split light receiving element for receiving a beam spot reflected from said subject, a transparent plate disposed between said light-receiving optical system and said half-split light receiving element so as to be rotatable around a shaft extending substantially orthogonal with respect to a plane including the optical axis of said light-projecting optical system and the optical axis of said light-receiving optical system, at least one optical lens forming part of a photographic lens and adapted to move along the lens optical axis for attaining the focus, and means for converting the stroke of linear movement of said optical lens into the stroke of inclining movement of said transparent plate, the linear movement of said optical lens being ceased as soon as the output signal of said half-split light receiving element attains a predetermined level.

2. An automatic focusing apparatus as claimed in claim 1, wherein the front surface and the rear surface of said transparent plate are substantially parallel to each other.

3. An automatic focusing apparatus as claimed in claim 1, wherein said converting means includes a cam provided on the rear end of a focus ring supporting said optical lens adapted to move along the lens optical axis, a lever fixed to said transparent plate, and a rod fixed to said lever to make intimate contact with said cam.

* * * * *